US012807456B2

(12) United States Patent
Otsuka et al.

(10) Patent No.: US 12,807,456 B2
(45) Date of Patent: Nov. 24, 2026

(54) ELEVATOR SYSTEM

(71) Applicant: Mitsubishi Electric Corporation, Tokyo (JP)

(72) Inventors: Yasushi Otsuka, Tokyo (JP); Hisahiro Wadayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 745 days.

(21) Appl. No.: 18/271,672

(22) PCT Filed: Mar. 29, 2021

(86) PCT No.: PCT/JP2021/013338

§ 371 (c)(1),
(2) Date: Jul. 11, 2023

(87) PCT Pub. No.: WO2022/208618

PCT Pub. Date: Oct. 6, 2022

(65) Prior Publication Data

US 2024/0059522 A1 Feb. 22, 2024

(51) Int. Cl.
*B66B 1/32* (2006.01)
*B66B 5/02* (2006.01)

(52) U.S. Cl.
CPC ................ *B66B 1/32* (2013.01); *B66B 5/027* (2013.01)

(58) Field of Classification Search
CPC .................................. B66B 1/32; B66B 5/027
USPC .......................................................... 187/247
See application file for complete search history.

(56) References Cited

U.S. PATENT DOCUMENTS

| | | | | |
|---|---|---|---|---|
| 3,876,918 A * | 4/1975 | Komuro | B66B 1/285 | 318/743 |
| 4,319,665 A * | 3/1982 | Komuro | B66B 1/285 | 187/296 |
| 2008/0060882 A1 * | 3/2008 | Nuebling | B66B 5/0031 | 187/288 |
| 2009/0133964 A1 * | 5/2009 | Ueda | B66B 5/22 | 187/254 |

(Continued)

FOREIGN PATENT DOCUMENTS

| | | |
|---|---|---|
| EP | 3421405 A1 | 1/2019 |
| JP | 2013-119436 A | 6/2013 |
| JP | 2017-149552 A | 8/2017 |

OTHER PUBLICATIONS

International Search Report mailed on Jun. 15, 2021, received for PCT Application PCT/JP2021/013338, filed on Mar. 29, 2021, 5 pages including English Translation.

*Primary Examiner* — Kawing Chan
(74) *Attorney, Agent, or Firm* — XSENSUS LLP

(57) ABSTRACT

A third instruction determination unit determines a current instruction on the basis of a first current instruction determined by a first instruction determination unit (23) and a second current instruction determined by a second instruction determination unit (24). A brake control unit (25) controls a brake device (6) on the basis of the current instruction. The second instruction determination unit (24) determines the second current instruction so that the value of a current indicated by the current instruction determined by the third instruction determination unit increases stepwise when a brake switch (7) ceases to detect that the brake device (6) is in a non-braking state.

10 Claims, 8 Drawing Sheets

(56) References Cited

U.S. PATENT DOCUMENTS

| | | | | |
|---|---|---|---|---|
| 2009/0145698 | A1 * | 6/2009 | Kondo | B66B 1/32<br>187/288 |

* cited by examiner

8 CONTROLLER
21 SPEED DETECTION UNIT
22 INSTRUCTION GENERATION UNIT
23 FIRST INSTRUCTION DETERMINATION UNIT
24 SECOND INSTRUCTION DETERMINATION UNIT
25 BRAKE CONTROL UNIT

23 FIRST INSTRUCTION DETERMINATION UNIT
24 INTEGRATOR

23 FIRST INSTRUCTION DETERMINATION UNIT

8 CONTROLLER
21 SPEED DETECTION UNIT
22 INSTRUCTION GENERATION UNIT
23 FIRST INSTRUCTION DETERMINATION UNIT
24 SECOND INSTRUCTION DETERMINATION UNIT
25 BRAKE CONTROL UNIT
29 FEEDFORWARD CONTROL UNIT

8 CONTROLLER
21 SPEED DETECTION UNIT
22 INSTRUCTION GENERATION UNIT
23 FIRST INSTRUCTION DETERMINATION UNIT
24 SECOND INSTRUCTION DETERMINATION UNIT
25 BRAKE CONTROL UNIT
29 FEEDFORWARD CONTROL UNIT
31 DISTANCE DETECTION UNIT

ELEVATOR SYSTEM

CROSS-REFERENCE TO RELATED APPLICATION

The present application is based on PCT filing PCT/JP2021/013338, filed Mar. 29, 2021, the entire contents of which are incorporated herein by reference.

FIELD

The present disclosure relates to an elevator system.

BACKGROUND ART

PTL 1 discloses an elevator system. In the elevator system disclosed in PTL 1, if passengers are trapped in a car, rescue operation for rescuing the passengers is performed.

CITATION LIST

Patent Literature

[PTL 1] JP 2013-119436 A

SUMMARY

Technical Problem

In the elevator system disclosed in PTL 1, the rescue operation is performed by controlling a brake device. However, in the system, hysteresis is not taken into account when braking force of the brake device is controlled. Thus, the car vibrates upon the rescue operation, which provides a feeling of discomfort to the passengers.

The present disclosure has been made to solve the problem as described above. An object of the present disclosure is to provide an elevator system capable of preventing vibration of a car upon operation utilizing a brake device.

Solution to Problem

An elevator system according to the present disclosure comprises a traction machine configured to drive a car by rotating a driving sheave, a brake device configured to generate braking force for rotation of the driving sheave, a sensor configured to detect that the brake device is in a non-braking state, instruction generation means for generating an instruction for a speed of the car, speed detection means for detecting a speed of the car, first instruction determination means for determining a first current instruction on a basis of a deviation between the speed indicated by the instruction generated by the instruction generation means and the speed detected by the speed detection means, second instruction determination means for determining a second current instruction, third instruction determination means for determining a current instruction for the brake device on a basis of the first current instruction determined by the first instruction determination means and the second current instruction determined by the second instruction determination means, and brake control means for controlling the brake device on a basis of the current instruction determined by the third instruction determination means. The second instruction determination means determines the second current instruction so that a value of a current indicated by the current instruction determined by the third instruction determination means increases stepwise when the sensor ceases to detect that the brake device is in the non-braking state.

Advantageous Effects of Invention

In an elevator system according to the present disclosure, third instruction determination means determines a current instruction for a brake device on the basis of a first current instruction determined by first instruction determination means and a second current instruction determined by second instruction determination means. The second instruction determination means determines the second current instruction so that the value of a current indicated by the current instruction determined by the third instruction determination means increases stepwise when a sensor ceases to detect that the brake device is in a non-braking state. According to the present elevator system, it is possible to prevent vibration of a car upon operation utilizing the brake device.

DESCRIPTION OF EMBODIMENTS

Figure 1:
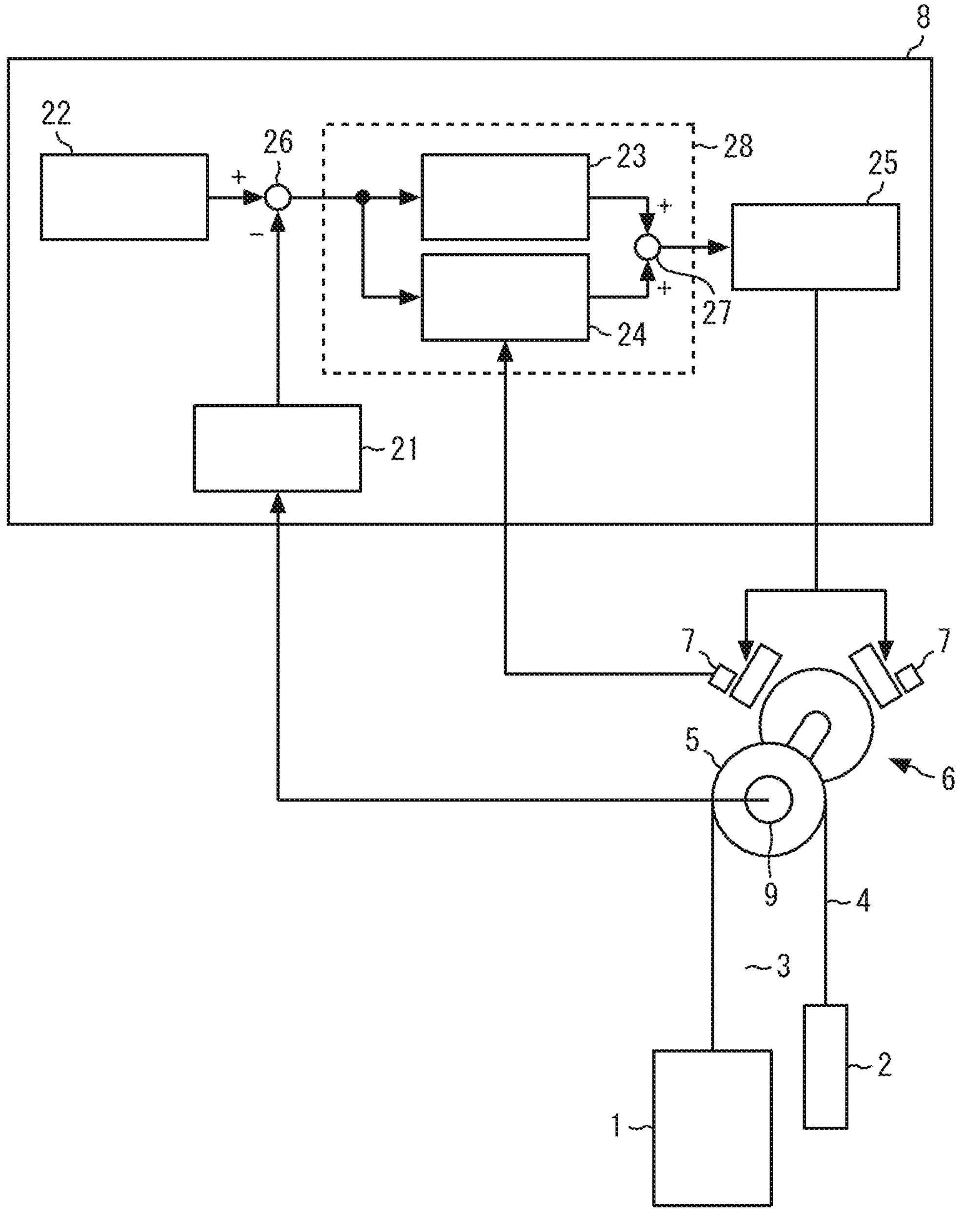
FIG. 1 is a diagram illustrating an example of an elevator system in a first embodiment.

Detailed description will be provided below with reference to the drawings. Redundant description will be simplified or omitted as appropriate. In the drawings, the same reference numerals indicate the same portions or corresponding portions.

First Embodiment

FIG. 1 is a diagram illustrating an example of an elevator system in a first embodiment. The elevator system includes a car 1 and a counterweight 2. The car 1 moves upward and downward in a shaft 3. The counterweight 2 moves upward and downward in the shaft 3. The shaft 3 is space formed in a building and extending upward and downward. The car 1 and the counterweight 2 are hung in the shaft 3 with a rope 4. FIG. 1 illustrates the elevator system employing a 1:1 roping system as an example. In the present elevator system, a 2:1 roping system may be employed.

A traction machine 5 includes a driving sheave. The rope 4 is wound around the driving sheave of the traction machine 5. The car 1 moves upward and downward in the shaft 3 as a result of rotation of the driving sheave. In other words, the traction machine 5 drives the car 1 by rotating the driving sheave.

A brake device 6 generates braking force that becomes resistance to the rotation of the driving sheave. In normal operation, the car 1 is decelerated and stopped by the traction machine 5. The brake device 6 generates braking force after the car 1 is stopped so that the car 1 does not move.

FIG. 1 illustrates an example where the brake device 6 is a device different from the traction machine 5. The brake device 6 may be incorporated into the traction machine 5. In the following description, a state where the braking force is generated in the brake device 6 will be also referred to as a braking state. A state where the braking force is not generated in the brake device 6 will be also referred to as a non-braking state.

A brake switch 7 is provided in the brake device 6. The brake switch 7 detects that the brake device 6 is in the non-braking state. The brake switch 7 outputs a detection signal if the brake switch 7 detects that the brake device 6 is in the non-braking state. The brake switch 7 is one example of a sensor for detecting that the brake device 6 is in the non-braking state. Sensors other than the brake switch 7 may be used as the sensor. Any detection method may be employed as a detection method of the sensor.

A controller 8 controls the traction machine 5 and the brake device 6. The traction machine 5, the brake device 6 and the controller 8 are provided in a machine room above the shaft 3. The traction machine 5, the brake device 6 and the controller 8 may be provided in the shaft 3.

A position detector 9 is provided at the traction machine 5. The position detector 9 is, for example, an optical encoder. The position detector 9 may be a resolver or a magnetic sensor. The position detector 9 detects a rotation angle of the driving sheave. The rotation angle detected by the position detector 9 is used in speed control and position control of the car 1. The rotation angle detected by the position detector 9 is used for determining output of a voltage instruction for the brake device 6.

A rated load is set in advance for the car 1. As an example, a weight of the counterweight 2 is set so that the car 1 is in balance with the counterweight 2 when a load that is 50% of the rated load acts on the car 1. As another example, the weight of the counterweight 2 may be set so that the car 1 is in balance with the counterweight 2 when a load that is 40% of the rated load or a load that is 45% of the rated load acts on the car 1.

If the weight of the car 1 does not completely match the weight of the counterweight 2, a weight difference occurs between the car 1 and the counterweight 2. If a weight difference occurs between the car 1 and the counterweight 2, unbalance torque due to this weight difference acts on the traction machine 5. Thus, if the brake device 6 is put into the non-braking state in this state, the car 1 and the counterweight 2 move without the traction machine 5 generating torque for driving the car 1. For example, in a case where passengers are trapped in the car 1 when the car 1 cannot be driven by the traction machine 5, the passengers can be rescued by putting the brake device 6 into the non-braking state. In the following description, operation to be performed for this rescue will be also referred to as rescue operation.

The controller 8 includes a function for controlling the rescue operation. Specifically, the controller 8 includes a speed detection unit 21, an instruction generation unit 22, a first instruction determination unit 23, a second instruction determination unit 24 and a brake control unit 25. The controller 8 further includes a subtractor 26, and an adder 27 as a third instruction determination unit. The first instruction determination unit 23, the second instruction determination unit 24 and the adder 27 are included in a speed controller 28.

The speed detection unit 21 detects the rotation speed of the driving sheave. As described above, the rope 4 for hanging the car 1 is wound around the driving sheave of the traction machine 5. Thus, the car 1 moves in accordance with rotation of the driving sheave. A function of the speed detection unit 21 is synonymous with a function of detecting the speed of the car 1.

The speed detection unit 21 calculates the rotation speed of the driving sheave on the basis of the rotation angle detected by the position detector 9. As an example, the speed detection unit 21 obtains the rotation speed by differentiating the rotation angle with respect to time. The speed detection unit 21 may smooth the rotation speed using a low pass filter for removing noise generated by temporal differentiation. The speed detection unit 21 may detect the rotation speed of the driving sheave every time a fixed period progresses. The fixed period is set in advance. To implement such a function, the speed detection unit 21 may include a timer.

The instruction generation unit 22 generates an instruction for the rotation speed of the driving sheave. As described above, the car 1 moves in accordance with rotation of the driving sheave. Thus, a function of the instruction generation unit 22 is synonymous with a function of generating an instruction for the speed of the car 1.

The instruction generation unit 22 generates a speed instruction for moving the car 1 to a hall on a destination floor. As an example, the instruction generation unit 22 includes a position control system of the traction machine 5 and generates the speed instruction as an output of position control.

The subtractor 26 outputs the deviation between the speed indicated by the instruction generated by the instruction generation unit 22 and the speed detected by the speed detection unit 21. For example, the subtractor 26 subtracts the speed detected by the speed detection unit 21 from the speed indicated by the instruction generated by the instruction generation unit 22. In the following description, the speed indicated by the instruction generated by the instruction generation unit 22 will be also referred to as an instructed speed. The speed detected by the speed detection unit 21 will be also referred to as a detected speed.

The first instruction determination unit 23 determines a first current instruction for the brake device 6. The first instruction determination unit 23 calculates the first current instruction on the basis of the deviation output from the subtractor 26. In the first instruction determination unit 23, P control is used as a control method for calculating the first current instruction. In the first instruction determination unit 23, PI control or PID control may be used as the control method.

The second instruction determination unit 24 determines a second current instruction for the brake device 6. The detection signal from the brake switch 7 is input to the second instruction determination unit 24. The second instruction determination unit 24 uses the detection signal from the brake switch 7 and the deviation output from the subtractor 26 to determine the second current instruction.

The third instruction determination unit determines a current instruction for the brake device 6 on the basis of the first current instruction determined by the first instruction determination unit 23 and the second current instruction determined by the second instruction determination unit 24. In the example illustrated in FIG. 1, the third instruction determination unit is the adder 27. The adder 27 adds the first current instruction determined by the first instruction determination unit 23 and the second current instruction determined by the second instruction determination unit 24. A sum calculated by the adder 27 is output from the speed controller 28 as a current instruction for the brake device 6.

The brake control unit 25 controls the brake device 6 on the basis of the current instruction determined by the third instruction determination unit. For example, the brake control unit 25 calculates a voltage instruction for the brake device 6 on the basis of the current instruction output from the adder 27. The brake control unit 25 may generate the voltage instruction using the output from the adder 27 after detecting a current of the brake device 6.

Figure 2:
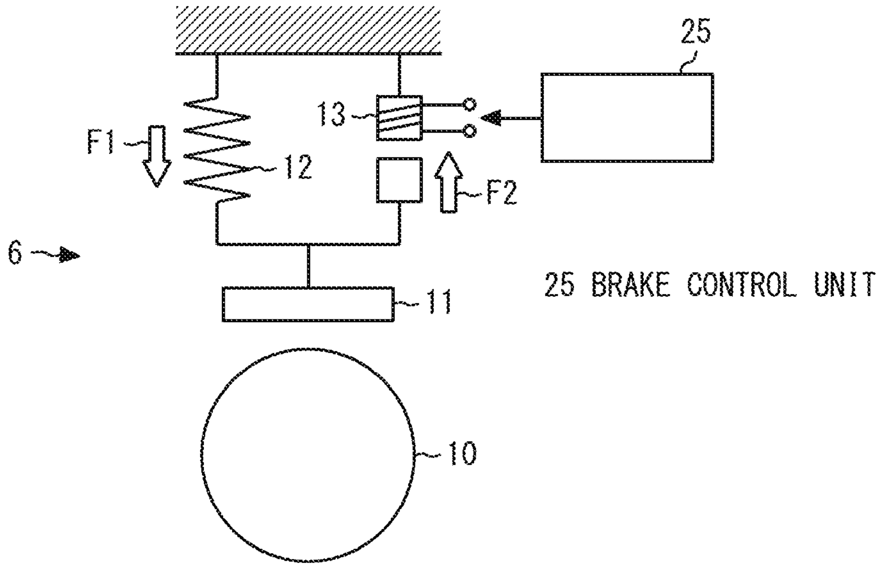
FIG. 2 is a diagram illustrating an example of a brake device.

FIG. 2 is a diagram illustrating an example of the brake device 6. The brake device 6 includes a brake drum 10, a brake shoe 11, a spring 12 and an electromagnetic coil 13. The brake shoe 11, the spring 12 and the electromagnetic coil 13 are included in a brake module. FIG. 1 illustrates an example where the brake device 6 includes a pair of brake modules. The brake switch 7 is provided for each of the brake modules.

The brake drum 10 rotates when the driving sheave of the traction machine 5 rotates and stops when the driving sheave stops. FIG. 1 illustrates an example where the brake drum 10 is coupled to the driving sheave via a shaft. As another example, the brake drum 10 may be integrally provided with the driving sheave. The brake shoe 11 faces the brake drum 10. The brake shoe 11 moves so as to come close to and move away from the brake drum 10. If the brake shoe 11 comes into contact with the brake drum 10, braking force is generated. If the brake shoe 11 is away from the brake drum 10, braking force is not generated.

The spring 12 generates force F1 for pressing the brake shoe 11 against the brake drum 10. The electromagnetic coil 13 generates attraction force F2 in a direction in which the brake shoe 11 moves away from the brake drum 10.

If a current does not flow through the electromagnetic coil 13, the attraction force F2 is not generated. Thus, the brake shoe 11 is pressed against the brake drum 10 by the force F1 by the spring 12. Thus, braking force in accordance with the force F1 is generated.

The attraction force F2 changes in accordance with a magnitude of the current flowing through the electromagnetic coil 13. If a current flows through the electromagnetic coil 13, braking force in accordance with force (F1–F2) obtained by subtracting the attraction force F2 from the force F1 is generated. If the value of the current flowing through the electromagnetic coil 13 becomes greater to a certain value, the attraction force F2 becomes greater than the force F1. If the attraction force F2 is greater than the force F1, the brake shoe 11 moves away from the brake drum 10. In this state, the braking force is not generated.

In a case where a current sufficient for the brake shoe 11 to move away from the brake drum 10 flows through the electromagnetic coil 13, even if the current flowing through the electromagnetic coil 13 becomes small, the attraction force F2 is greater than the force F1 for a certain period. During this period, the brake shoe 11 does not start moving.

If the value of the current flowing through the electromagnetic coil 13 becomes small to a certain value, the attraction force F2 becomes smaller than the force F1. As a result, the brake shoe 11 moves to come closer to the brake drum 10. In the example illustrated in FIG. 2, the brake shoe 11 falls so as to come closer to the brake drum 10. Then, if the brake shoe 11 is pressed against the brake drum 10, the braking force is generated.

As an example, the brake switch 7 is provided to output a detection signal when the brake shoe 11 is away from the brake drum beyond a specific position. In the example illustrated in FIG. 2, if the attraction force F2 is generated, the brake shoe 11 moves upward. If the brake shoe 11 moves upward by a fixed distance, the brake shoe 11 moves away from the brake drum 10, and generation of the braking force is stopped. The brake switch 7 is provided so as to be able to detect this movement of the brake shoe 11.

Figure 3:
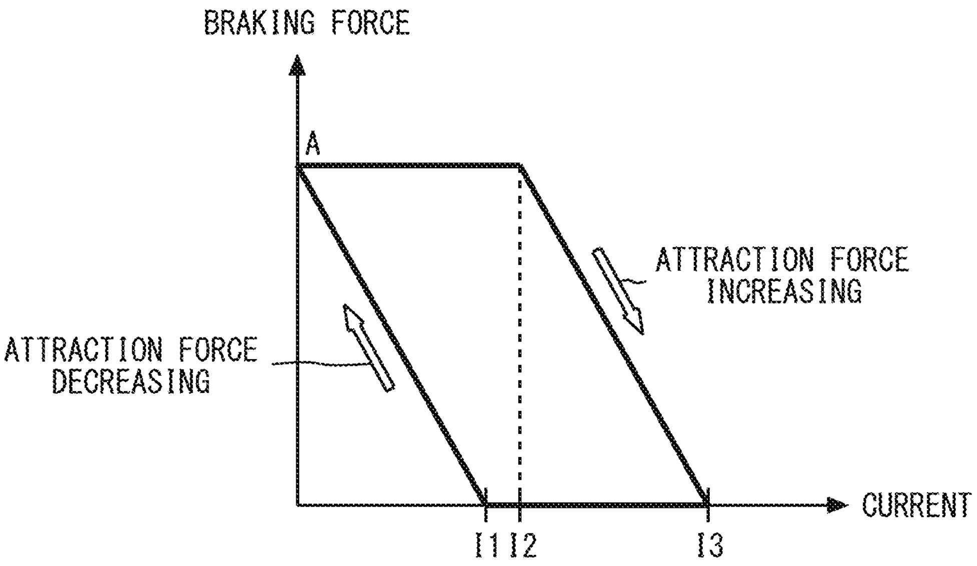
FIG. 3 is a graph illustrating a relationship between a current and braking force of the brake device.

FIG. 3 is a graph illustrating a relationship between a current and braking force of the brake device 6. FIG. 3 indicates the current of the brake device 6, that is, the current flowing through the electromagnetic coil 13 on a horizontal axis. FIG. 3 indicates braking force generated by the brake device 6 on a vertical axis. As illustrated in FIG. 3, in the relationship between the current and the braking force of the brake device 6, hysteresis occurs when the current is increased until the braking force becomes 0 and when the current is decreased after the braking force becomes 0.

In a state of A illustrated in FIG. 3, a current does not flow through the electromagnetic coil 13. Even if a current starts flowing through the electromagnetic coil 13 from this state, the braking force does not change until the value of the current becomes I2. If the value of the current flowing through the electromagnetic coil 13 becomes greater than I2, the braking force is reduced. If the value of the current flowing through the electromagnetic coil 13 becomes greater than I3, the braking force becomes 0. I3 is greater than I2.

On the other hand, even if the value of the current flowing through the electromagnetic coil 13 becomes smaller from a state where the value is greater than I3, the braking force does not change if the value of the current flowing through the electromagnetic coil 13 is greater than I1. The braking force at this time is 0. In the example illustrated in FIG. 3, I1 is smaller than I2. If the value of the current flowing through the electromagnetic coil 13 becomes smaller than I1, the braking force increases.

A typical example will be considered where rotation of the driving sheave is controlled by the brake device 6 having such hysteresis. As described above, a current starts flowing through the electromagnetic coil 13 from the state of A illustrated in FIG. 3 and if the value of the current becomes greater than I2, the braking force decreases. In this event, until the value of the current reaches I3, the braking force linearly changes with respect to a magnitude of the current without being affected by hysteresis. Thus, during this period, the braking force can be continuously controlled.

On the other hand, if the value of the current flowing through the electromagnetic coil 13 becomes greater than I3, the braking force is affected by hysteresis. Thus, if the value of the current becomes greater than I3, the braking force cannot be continuously controlled.

If the weight difference between the car 1 and the counterweight 2 is small, unbalance torque acting on the traction machine 5 is small. If the brake shoe 11 moves away from the brake drum 10 in such a state, the driving sheave is accelerated only moderately. Thus, a difference between the actual speed and the instructed speed of the driving sheave becomes greater. If the difference becomes greater, a current instruction for the brake device 6 becomes greater. In other words, a current instruction that makes the current flowing through the electromagnetic coil 13 greater is output. As a result, the value of the current flowing through the electromagnetic coil 13 exceeds I3.

Then, if the driving sheave is accelerated, and a difference between the actual speed and the instructed speed of the driving sheave becomes small, the current instruction for the brake device 6 becomes small. However, if the value of the current flowing through the electromagnetic coil 13 exceeds I3 once, even if the current instruction for the brake device 6 becomes small, the braking force is not generated unless the value of the current flowing through the electromagnetic coil 13 becomes smaller than I1. Thus, the braking force cannot be continuously controlled.

Figure 4:
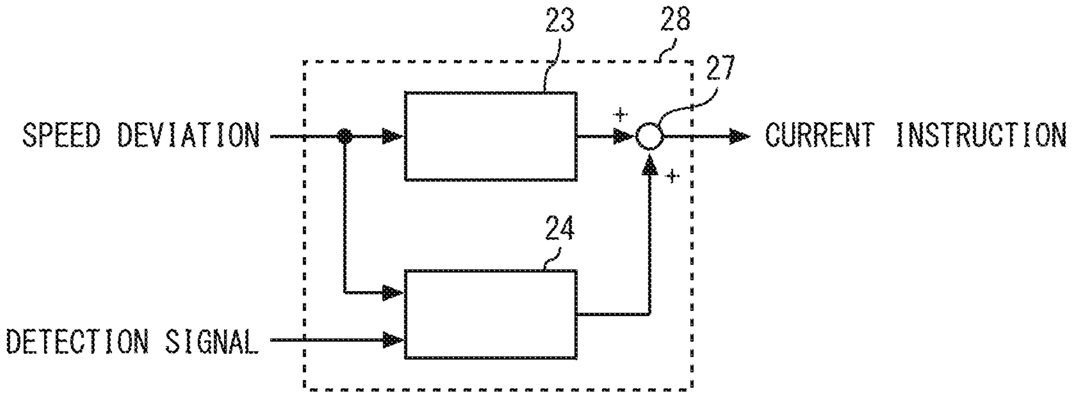
FIG. 4 is a diagram illustrating an example of a speed controller.
Figure 5:
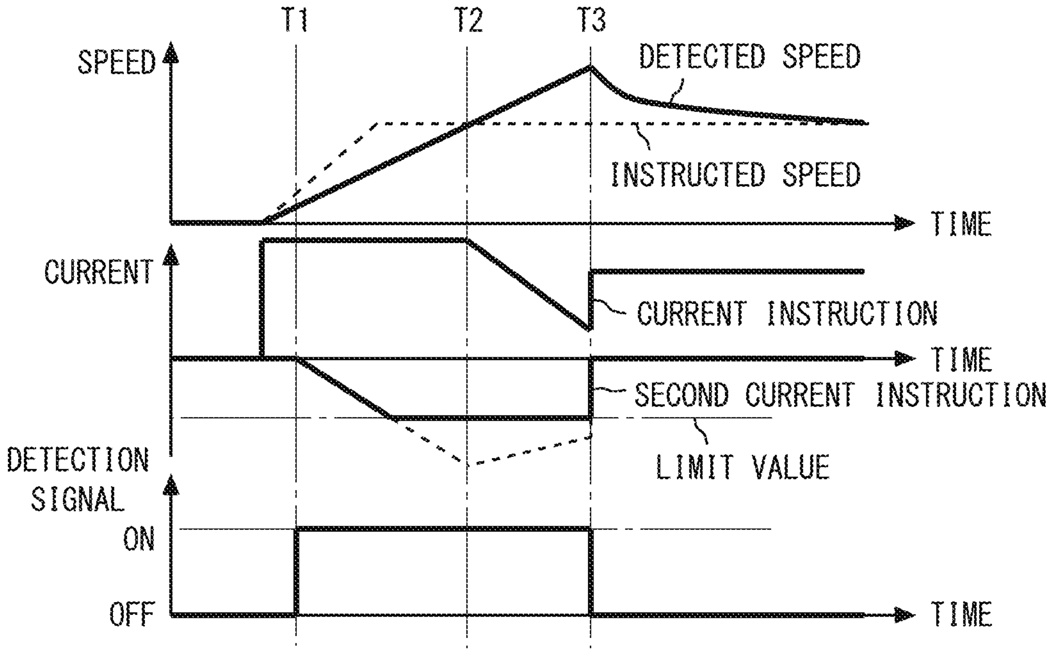
FIG. 5 is a diagram for explaining an operation example of the elevator system in the first embodiment.

Operation of the present elevator system will be described in detail next also using FIG. 4 and FIG. 5. FIG. 4 is a diagram illustrating an example of the speed controller 28. FIG. 5 is a diagram for explaining an operation example of the elevator system in the first embodiment. An upper part of FIG. 5 indicates the speed of the car 1. A middle part of FIG. 5 indicates the current of the brake device 6. A lower part of FIG. 5 indicates the detection signal output from the brake switch 7.

FIG. 4 illustrates an example where the second instruction determination unit 24 is an integrator. The speed deviation, that is, the deviation from the subtractor 26 and the detection signal from the brake switch 7 are input to the second instruction determination unit 24. The second instruction determination unit 24 does not perform integration processing unless the brake switch 7 detects that the brake device 6 is in the non-braking state. Thus, the second instruction determination unit 24 resets the integrator to set the second current instruction to 0 unless the detection signal from the brake switch 7 is input.

On the other hand, if the brake switch 7 detects that the brake device 6 is in the non-braking state, the second instruction determination unit 24 performs integration processing. Thus, the second instruction determination unit 24 determines the second current instruction by integrating the deviation from the subtractor 26 if the detection signal from the brake switch 7 is input.

As illustrated in FIG. 5, if the rescue operation is started, an instruction for increasing the current flowing through the electromagnetic coil 13 is output from the controller 8 to the brake device 6. By this means, the brake shoe 11 moves away from the brake drum 10, and the braking force becomes 0. In this event, if the weight difference between the car 1 and the counterweight 2 is small, even if the brake shoe 11 moves away from the brake drum 10, the driving sheave is accelerated only moderately. If the acceleration is moderate, the detected speed does not follow the instructed speed. Thus, an instruction for increasing the current flowing through the electromagnetic coil 13 is continuously output from the controller 8.

If the rescue operation is started, the brake switch 7 detects that the brake device 6 is in the non-braking state at time T1. By this means, the brake switch 7 outputs a detection signal. As described above, the second instruction determination unit 24 outputs 0 as the second current instruction if the detection signal from the brake switch 7 is not input. If the detection signal from the brake switch 7 is input at time T1, the second instruction determination unit 24 starts processing of integrating the deviation from the subtractor 26.

Note that an integral gain of the second instruction determination unit 24 is set so that the second current instruction is calculated so as to make the value of the current flowing through the electromagnetic coil 13 smaller. In the example illustrated in FIG. 5, the detected speed does not reach the instructed speed at time T1, and thus, the speed deviation becomes positive. Thus, by setting the integral gain of the second instruction determination unit 24 to be negative, the second current instruction that makes the value of the current flowing through the electromagnetic coil 13 smaller can be set.

In the example illustrated in FIG. 5, the value of the current indicated by the second current instruction is limited by a limit value. This limit value is set on the basis of a difference between the value of the current required for the brake device 6 to be put into the non-braking state from the braking state and the value of the current required for the brake device 6 to be put into the braking state from the non-braking state. The value of the current required for the brake device 6 to be put into the non-braking state from the braking state corresponds to I3 illustrated in FIG. 3. The value of the current required for the brake device 6 to be put into the braking state from the non-braking state corresponds to I1 illustrated in FIG. 3. Thus, the limit value is preferably set at (I3−I1).

In the example illustrated in FIG. 5, the detected speed matches the instructed speed at time T2. If the detected speed matches the instructed speed, an instruction for decreasing the current flowing through the electromagnetic coil 13 is output from the controller 8. In other words, the controller 8 outputs an instruction for generating the braking force to decrease the rotation speed of the driving sheave.

However, as illustrated in FIG. 3, the value of the current flowing through the electromagnetic coil 13 is required to be decreased to I1 to generate the braking force. The braking force is not generated until the value of the current flowing through the electromagnetic coil 13 is decreased to I1. Thus, also after the detected speed matches the instructed speed, the car 1 continues to accelerate. Thus, after the detected speed matches the instructed speed, the detected speed becomes higher than the instructed speed. Further, after the detected speed matches the instructed speed, the detection signal is continuously output from the brake switch 7.

Thereafter, the value of the current flowing through the electromagnetic coil 13 becomes I1 at time T3. By this means, the brake shoe 11 is pressed against the brake drum 10. Thus, the braking force is generated.

Further, the brake switch 7 ceases to detect that the brake device 6 is in the non-braking state at time T3. Thus, output of the detection signal from the brake switch 7 is stopped. If input of the detection signal from the brake switch 7 is stopped at time T3, the second instruction determination unit 24 sets the second current instruction to 0.

In this manner, in the example illustrated in FIG. 5, the value of the current indicated by the second current instruction becomes 0 from the limit value at time T3. Therefore, the value of the current indicated by the current instruction output from the adder 27 increases precipitously and stepwise by an amount corresponding to (I3−I1) at time T3. This corresponds to increasing the value of the current that has decreased to I1, to I3 in the example illustrated in FIG. 3.

In a case where the weight difference between the car 1 and the counterweight 2 is small, if the brake shoe 11 is pressed against the brake drum 10 too hard, the car 1 vibrates or receives an impact. The function of the second instruction determination unit 24 can resolve hysteresis characteristics of the brake device 6. Thus, the braking force can be continuously controlled also at time T3. This makes it possible to prevent vibration of the car 1 and impact received by the car 1 at time T3. Further, there is no possibility of providing a feeling of anxiety to passengers in the car 1 by vibration occurring during the rescue operation.

Note that after time T3, the braking force can be continuously controlled without being affected by hysteresis. Thus, the detected speed changes so as to follow the instructed speed.

Figure 6:
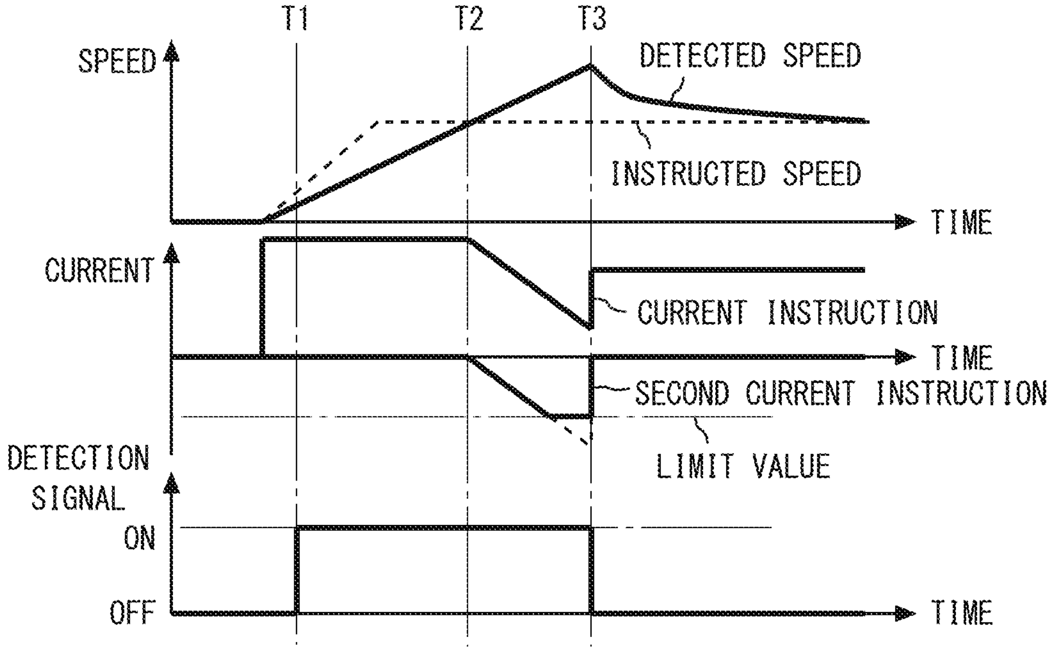
FIG. 6 is a diagram for explaining another operation example of the elevator system in the first embodiment.

FIG. 6 is a diagram for explaining another operation example of the elevator system in the first embodiment. Also in the example illustrated in FIG. 6, in a similar manner to the example illustrated in FIG. 5, the second instruction determination unit 24 sets the second current instruction to 0 if the brake switch 7 ceases to detect that the brake device 6 is in the non-braking state. However, the second instruction determination unit 24 determines the second current instruction so that the value of the current indicated by the current instruction determined by the third instruction determination unit increases precipitously and stepwise.

On the other hand, the example illustrated in FIG. 6 is different from the example illustrated in FIG. 5 in a timing at which the second instruction determination unit 24 starts the integration processing. In the example illustrated in FIG. 6, even if the detection signal is input from the brake switch 7 at time T1, if the instructed speed is higher than the detected speed, the second instruction determination unit 24 sets the second current instruction to 0. In other words, if the brake switch 7 detects that the brake device 6 is in the non-braking state and the detected speed is higher than the instructed speed, the second instruction determination unit 24 performs processing of integrating the deviation. Note that from time T2 to time T3, the speed deviation becomes negative. Thus, in the example illustrated in FIG. 6, the integral gain of the second instruction determination unit 24 is set to be positive.

In the present embodiment, a case has been described where the weight difference between the car 1 and the counterweight 2 is small. This is an example. According to the example described in the present embodiment, similar effects can be expected regardless of the weight difference between the car 1 and the counterweight 2. In other words, vibration of the car 1 and impact received by the car 1 at time T3 can be prevented regardless of whether the load of the car 1 is large or small.

Further, in the example described in the present embodiment, as illustrated in FIG. 1, feedback control in accordance with change of the speed of the car 1 is performed. Thus, unlike with bang-bang control, and the like, control excellent in robustness can be implemented on influence by an individual difference of the brake module and influence by temperature change.

Second Embodiment

Figure 7:
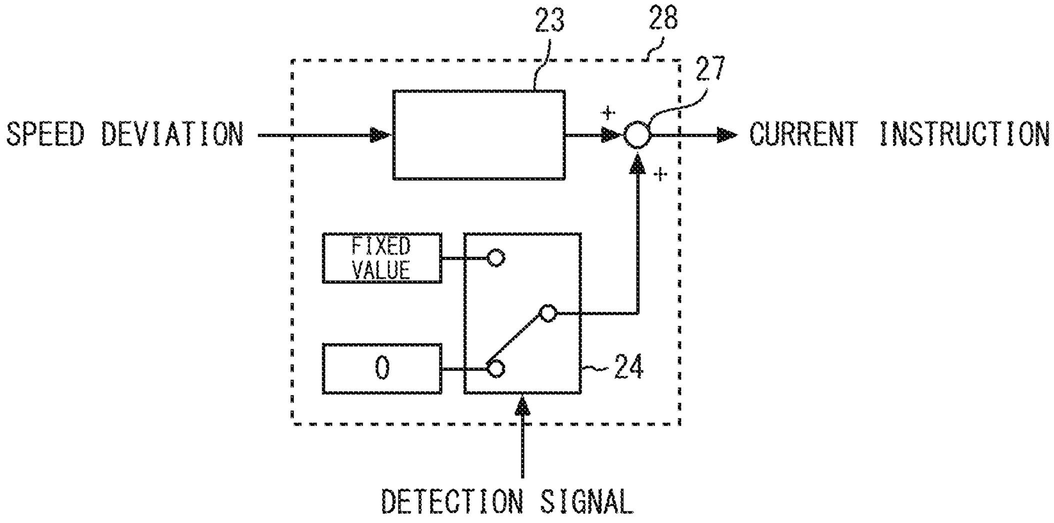
FIG. 7 is a diagram illustrating an example of the speed controller in a second embodiment.

FIG. 7 is a diagram illustrating an example of the speed controller 28 in a second embodiment. The speed controller 28 in the present embodiment includes the first instruction determination unit 23, the second instruction determination unit 24 and the adder 27. The example illustrated in FIG. 7 is different from the example described in the first embodiment in the function of the second instruction determination unit 24. Contents not specifically described in the present embodiment are similar to those in the example described in the first embodiment.

In the example illustrated in FIG. 7, the second instruction determination unit 24 determines the second current instruction to be 0 or a fixed value. The deviation from the subtractor 26 does not have to be input to the second instruction determination unit 24. However, in a similar manner to the example described in the first embodiment, the detection signal from the brake switch 7 is input to the second instruction determination unit 24.

The second instruction determination unit 24 sets the second current instruction to 0 unless the brake switch 7 detects that the brake device 6 is in the non-braking state. The second instruction determination unit 24 determines the second current instruction to be the fixed value if the brake switch 7 detects that the brake device 6 is in the non-braking state. The fixed value is set in advance.

Figure 8:
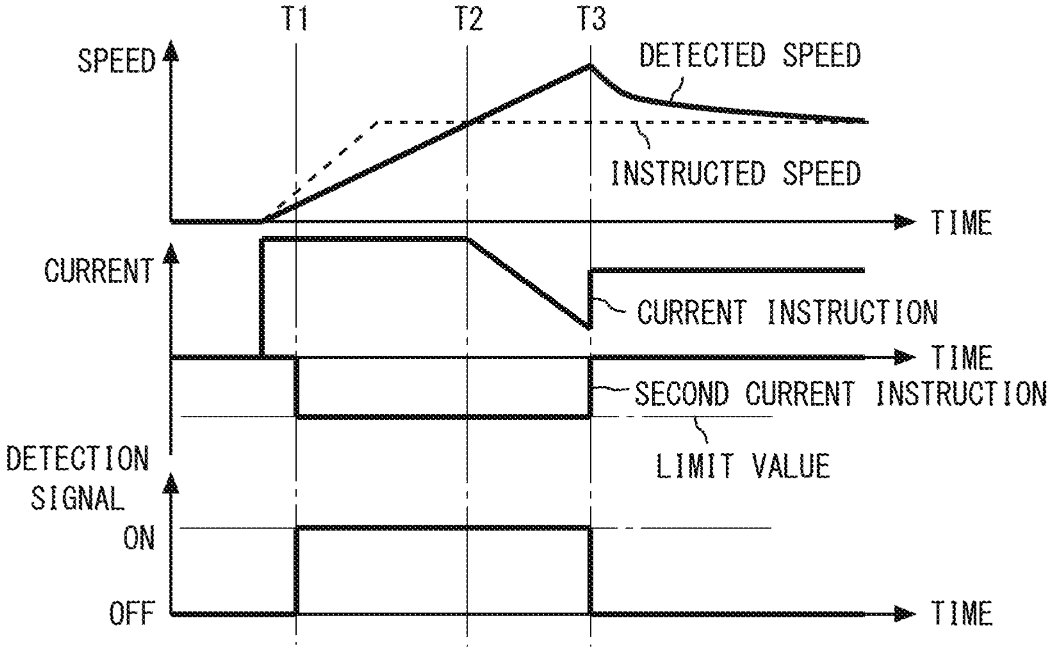
FIG. 8 is a diagram for explaining an operation example of an elevator system in the second embodiment.

FIG. 8 is a diagram for explaining an operation example of an elevator system in the second embodiment. FIG. 8 corresponds to FIG. 5.

If the rescue operation is started, as illustrated in FIG. 8, an instruction for increasing the current flowing through the electromagnetic coil 13 is output from the controller 8 to the brake device 6. If the weight difference between the car 1 and the counterweight 2 is small, in a similar manner to the example illustrated in FIG. 5, the instruction for increasing the current flowing through the electromagnetic coil 13 is continuously output from the controller 8.

If the rescue operation is started, the brake switch 7 detects that the brake device 6 is in the non-braking state at time T1. By this means, the brake switch 7 outputs a detection signal. As described above, the second instruction determination unit 24 outputs 0 as the second current instruction if the detection signal from the brake switch 7 is not input. If the detection signal from the brake switch 7 is input at time T1, the second instruction determination unit 24 outputs a fixed value as the second current instruction.

The fixed value is set so as to make the value of the current flowing through the electromagnetic coil 13 smaller. Thus, the value of the current indicated by the current instruction which is an output from the adder 27 becomes smaller in a case where the second current instruction is the fixed value than in a case where the second current instruction is 0. The fixed value may be set on the basis of a difference between the value of the current required for the brake device 6 to be put into the non-braking state from the braking state and the value of the current required for the brake device 6 to be put into the braking state from the non-braking state. FIG. 8 illustrates a preferred example in which the second instruction determination unit 24 outputs the above-described limit value as the fixed value.

In a similar manner to the example illustrated in FIG. 5, after the detected speed matches the instructed speed at time T2, the detected speed becomes higher than the instructed speed. Thereafter, at time T3, the value of the current flowing through the electromagnetic coil 13 becomes I1. This stops the brake switch 7 from detecting that the brake device 6 is in the non-braking state. In other words, output of the detection signal from the brake switch 7 is stopped at time T3. If input of the detection signal from the brake switch 7 is stopped at time T3, the second instruction determination unit 24 sets the second current instruction to 0.

In this manner, also in the example illustrated in FIG. 8, the value of the current indicated by the second current instruction becomes 0 from the limit value at time T3. Therefore, the value of the current indicated by the current instruction output from the adder 27 increases precipitously and stepwise by an amount corresponding to (I3−I1) at time T3. This corresponds to increasing the value of the current that has decreased to I1, to I3 in the example illustrated in FIG. 3.

The function of the second instruction determination unit 24 can resolve hysteresis characteristics of the brake device

6. Thus, also in the example described in the present embodiment, the braking force can be continuously controlled at time T3. This can prevent vibration of the car 1 and impact received by the car 1 at time T3. Further, there is no possibility of providing a feeling of anxiety to passengers in the car 1 by vibration occurring during the rescue operation.

Note that after time T3, the braking force can be continuously controlled without being affected by hysteresis. Thus, the detected speed changes so as to follow the instructed speed.

As another example, in a similar manner to the example illustrated in FIG. 6, even if the detection signal from the brake switch 7 is input at time T1, if the instructed speed is higher than the detected speed, the second instruction determination unit 24 may set the second current instruction to 0. In other words, the second instruction determination unit 24 outputs the fixed value as the second current instruction if the brake switch 7 detects that the brake device 6 is in the non-braking state and the detected speed is higher than the instructed speed.

Third Embodiment

Figure 9:
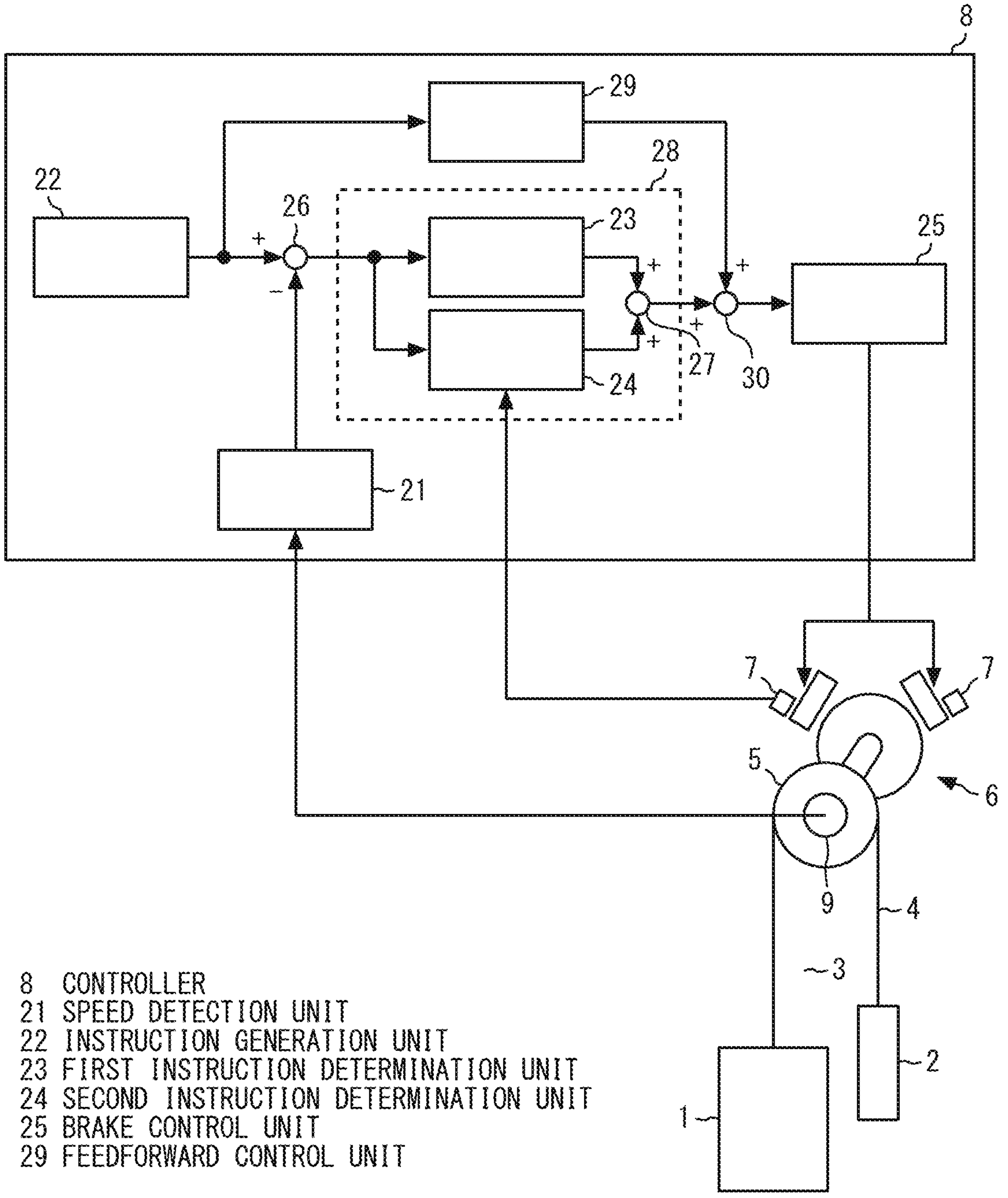
FIG. 9 is a diagram illustrating an example of an elevator system in a third embodiment.

FIG. 9 is a diagram illustrating an example of an elevator system in a third embodiment. The controller 8 in the present embodiment is different from the controller 8 illustrated in FIG. 1 in that a feedforward control unit 29 and an adder 30 are further included. Contents not specifically described in the present embodiment are similar to those in the example described in the first or the second embodiment.

An instruction generated by the instruction generation unit 22 is input to the feedforward control unit 29. The feedforward control unit 29 calculates a feedforward current instruction to follow the speed instruction from the instruction generation unit 22. The value of the current indicated by the feedforward current instruction is the value of an ideal current required for following this speed instruction.

The feedforward control unit 29 is preferably a differentiator because it is necessary to calculate such a value of an ideal current. If the speed is differentiated, acceleration is obtained. The acceleration is in the same dimension as torque and a current. As another example, the feedforward control unit 29 may include a pseudo differentiating filter. As long as the feedforward control unit 29 can calculate the value of the ideal current for following the speed instruction, the feedforward control unit 29 may calculate the value using any method.

The feedforward current instruction calculated by the feedforward control unit 29 is input to the adder 30. The adder 30 adds the current instruction from the adder 27 and the feedforward current instruction from the feedforward control unit 29. The output from the adder 30 is input to the brake control unit 25.

In the example illustrated in FIG. 9, the brake control unit 25 controls the brake device 6 also on the basis of the feedforward current instruction calculated by the feedforward control unit 29 as well as the current instruction determined by the third instruction determination unit. The feedforward current instruction indicates an ideal current required for following the speed instruction. Thus, according to the example illustrated in FIG. 9, followability to the speed instruction can be improved.

Fourth Embodiment

Figure 10:
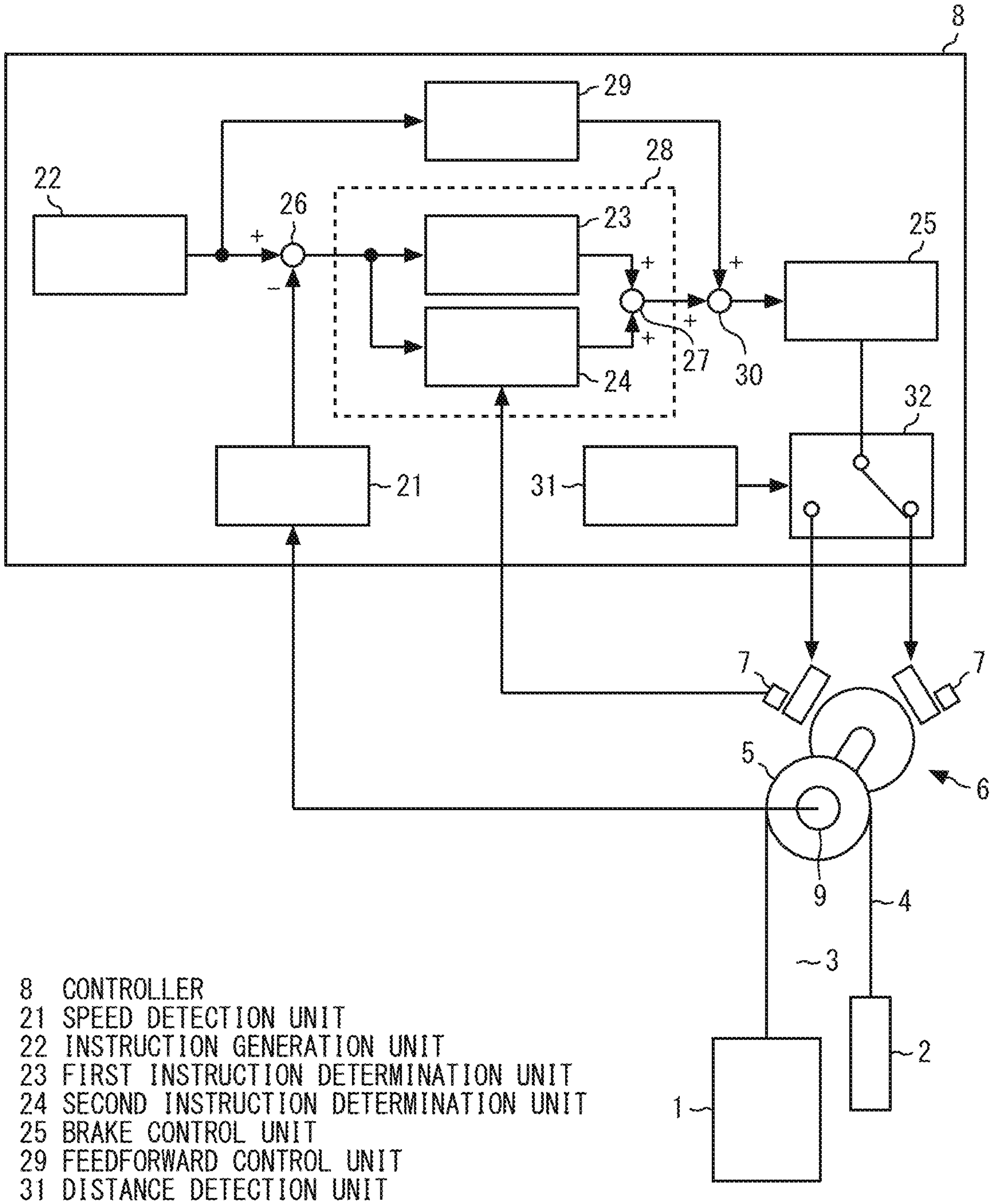
FIG. 10 is a diagram illustrating an example of an elevator system in a fourth embodiment.

FIG. 10 is a diagram illustrating an example of an elevator system in a fourth embodiment. The controller 8 in the present embodiment is different from the controller 8 illustrated in FIG. 9 in that a distance detection unit 31 and a brake selection unit 32 are further included. Contents not specifically described in the present embodiment are similar to those in the example described in any of the first to the third embodiments.

The distance detection unit 31 detects a moving distance of the car 1. As an example, the distance detection unit 31 detects the moving distance of the car 1 on the basis of the rotation angle detected by the position detector 9 and a diameter of the driving sheave. The diameter of the driving sheave is known. As another example, a dedicated sensor for detecting the moving distance of the car 1 may be used. The distance detection unit 31 may utilize a governor (not illustrated) to detect the moving distance of the car 1.

The brake selection unit 32 selects a brake module that is to generate braking force. In the example illustrated in FIG. 10, the brake device 6 includes a pair of brake modules. As described above, each brake module includes the brake shoe 11, the spring 12 and the electromagnetic coil 13. Therefore, each brake module can independently generate braking force. The brake selection unit 32 selects a brake module that is to generate braking force on the basis of the moving distance of the car 1 detected by the distance detection unit 31.

The brake device 6 is primarily used to hold the car 1 to stand still. The brake device 6 is not designed as a device for stopping the rotating driving sheave. Thus, if the brake device 6 is used to stop the rotating driving sheave, there is a possibility that the brake shoe 11 is excessively heated by friction with the brake drum 10.

The brake selection unit 32 switches a brake module that is to generate braking force every time the moving distance detected by the distance detection unit 31 reaches a fixed distance. This prevents the brake shoe 11 from being excessively heated. The fixed distance is set in advance so that an amount of heat generated at the brake shoe 11 does not exceed a design value in speed control performed in the rescue operation. For example, in a case where the amount of heat generated at the brake shoe 11 reaches the design value if the car 1 is moved by 1 m, the fixed distance is set at 1 m. A relationship between the moving distance of the car 1 and the amount of heat generated at the brake shoe 11 is obtained in advance, and the fixed distance is preferably set in accordance with the obtained result.

The voltage instruction from the brake control unit 25 is output to the brake module selected by the brake selection unit 32. In a case where the brake device 6 includes a pair of brake modules as in the example illustrated in FIG. 10, the brake modules that are to generate braking force are alternately switched. In a case where the brake device 6 includes three or more brake modules, it is only necessary that order of being selected by the brake selection unit 32 be determined in advance.

According to the example described in the present embodiment, it is possible to prevent the brake shoe 11 from being excessively heated in the rescue operation. It is therefore possible to prevent deterioration of the brake device 6 and prevent a failure of the brake device 6.

Figure 11:
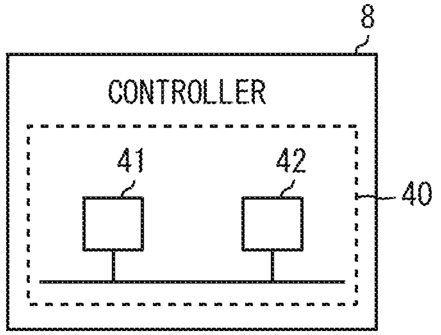
FIG. 11 is a diagram illustrating an example of hardware resources of a controller.

FIG. 11 is a diagram illustrating an example of hardware resources of the controller 8. The controller 8 includes circuitry 40 including a processor 41 and a memory 42 as the hardware resources. The circuitry 40 may include a plurality of processors 41. The circuitry 40 may include a plurality of memories 42.

In the present embodiments, the units indicated by reference numerals 21 to 32 indicate functions of the controller 8. The functions of the units indicated by the reference numerals 21 to 32 can be implemented by software, firmware, or a combination of software and firmware described as a program. The program is stored in the memory 42. The controller 8 implements the functions of the units indicated by the reference numerals 21 to 32 by executing, with the processor 41, the program stored in the memory 42.

The processor 41 is also referred to as a central processing unit (CPU), a central processing device, a processing device, an operation device, a microprocessor, a microcomputer or a DSP. As the memory 42, a semiconductor memory, a magnetic disk, a flexible disk, an optical disk, a compact disk, a mini disk or a DVD may be employed. The semiconductor memories that can be employed include a RAM, a ROM, a flash memory, an EPROM, an EEPROM, and the like.

Figure 12:
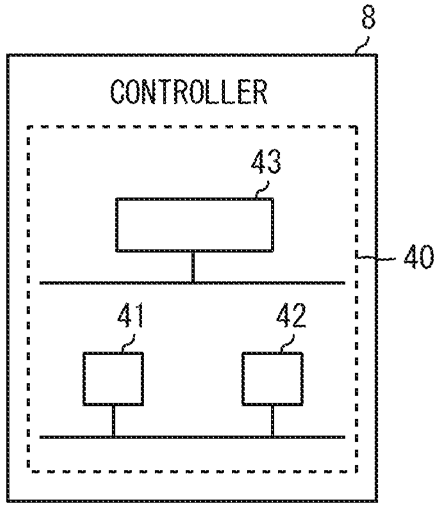
FIG. 12 is a diagram illustrating another example of the hardware resources of the controller.

FIG. 12 is a diagram illustrating another example of the hardware resources of the controller 8. In the example illustrated in FIG. 12, the controller 8 includes the circuitry 40 including the processor 41, the memory 42 and dedicated hardware 43. FIG. 12 illustrates an example where part of the functions of the controller 8 is implemented by the dedicated hardware 43. All of the functions of the controller 8 may be implemented by the dedicated hardware 43. As the dedicated hardware 43, a single circuit, a complex circuit, a programmed processor, a parallel programmed processor, an ASIC, an FPGA or a combination thereof can be employed.

INDUSTRIAL APPLICABILITY

The elevator system according to the present disclosure can be applied to an elevator system that performs rescue operation using a brake device.

REFERENCE SIGNS LIST

1 car, 2 counterweight, 3 shaft, 4 rope, 5 traction machine, 6 brake device, 7 brake switch, 8 controller, 9 position detector, 10 brake drum, 11 brake shoe, 12 spring, 13 electromagnetic coil, 21 speed detection unit, 22 instruction generation unit, 23 first instruction determination unit, 24 second instruction determination unit, 25 brake control unit, 26 subtractor, 27 adder, 28 speed controller, 29 feedforward control unit, 30 adder, 31 distance detection unit, 32 brake selection unit, 40 circuitry, 41 processor, 42 memory, 43 dedicated hardware

The invention claimed is:

1. An elevator system comprising:
   - a traction machine configured to drive a car by rotating a driving sheave;
   - a brake configured to generate braking force for rotation of the driving sheave;
   - a sensor configured to detect whether or not a braking force is generated in the brake and to indicate that the brake is in a non-braking state when the braking force is not generated in the brake; and
   - circuitry that is configured
     - to generate an instruction for a speed of the car;
     - to detect a speed of the car;
     - to determine a current value indicated by a first current instruction on a basis of a deviation between the speed indicated by the generated instruction and the detected speed;
     - to determine a current value indicated by a second current instruction;
     - to determine a current value indicated by a third current instruction for the brake on a basis of the determined first current instruction and the determined second current instruction;
     - to control a braking force of the brake on a basis of the current value indicated by the determined third current instruction; and
     - to determine the current value indicated by the second current instruction so that the value of the current indicated by the determined third current instruction increases stepwise when the sensor detects that the braking force is generated in the brake.

2. The elevator system according to claim 1, wherein the circuitry is configured to
   - set the second current instruction to 0 if the sensor does not detect that the brake is in the non-braking state, and
   - determine the second current instruction by integrating the deviation if the sensor detects that the brake is in the non-braking state.

3. The elevator system according to claim 2, wherein the value of the current indicated by the second current instruction is limited on a basis of a difference between a value of a current required for the brake to be put into the non-braking state from a braking state and a value of a current required for the brake to be put into the braking state from the non-braking state.

4. The elevator system according to claim 1, wherein the circuitry is configured to
   - set the second current instruction to 0 if the sensor does not detect that the brake is in the non-braking state, and
   - determine the second current instruction to be a fixed value set in advance if the sensor detects that the brake is in the non-braking state.

5. The elevator system according to claim 4, wherein the fixed value is set on a basis of a difference between a value of a current required for the brake to be put into the non-braking state from a braking state and a value of a current required for the brake to be put into the braking state from the non-braking state.

6. The elevator system according to claim 2, wherein even if the sensor detects that the brake is in the non-braking state, if the speed indicated by the generated instruction is higher than the detected speed, the circuitry is configured to set the second current instruction to 0.

7. The elevator system according to claim 1, wherein the circuitry is configured to
   - calculate a feedforward current instruction for following the generated instruction, and
   - control the brake on a basis of the determined third current instruction and the calculated feedforward current instruction.

8. The elevator system according to claim 1, wherein:
   - the brake includes a plurality of brake modules,
   - each of the plurality of brake modules is capable of generating braking force, and
   - the circuitry is configured to
   - detect a moving distance of the car, and
   - select a brake module that is to generate braking force on a basis of the detected moving distance.

9. The elevator system according to claim 4, wherein even if the sensor detects that the brake is in the non-braking state, if the speed indicated by the generated instruction is higher than the detected speed, the circuitry is configured to set the second current instruction to 0.

10. The elevator system according to claim 1, wherein the circuitry is configured to determine the third current instruction as a sum of the first current instruction and the second current instruction.

* * * * *